Sept. 13, 1932.  P. F. SHIVERS  1,877,605
OPPOSED MOTOR CONTROL SYSTEM
Filed May 16, 1931
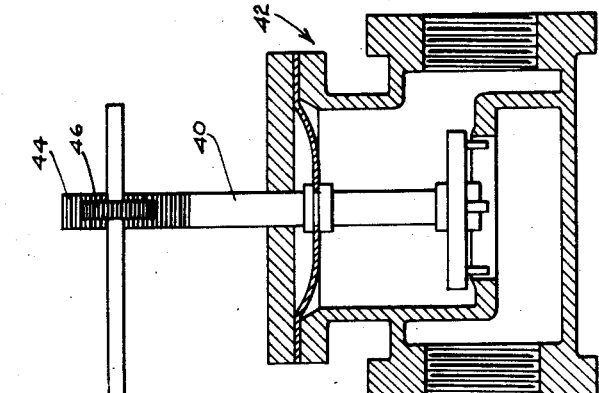
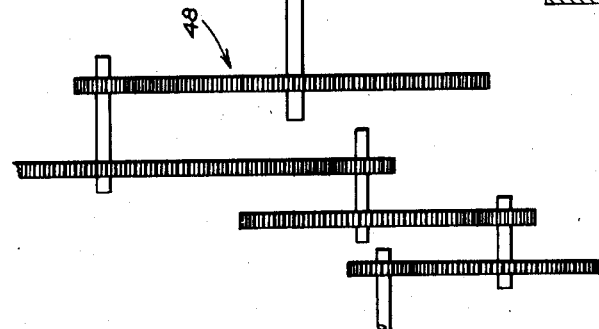
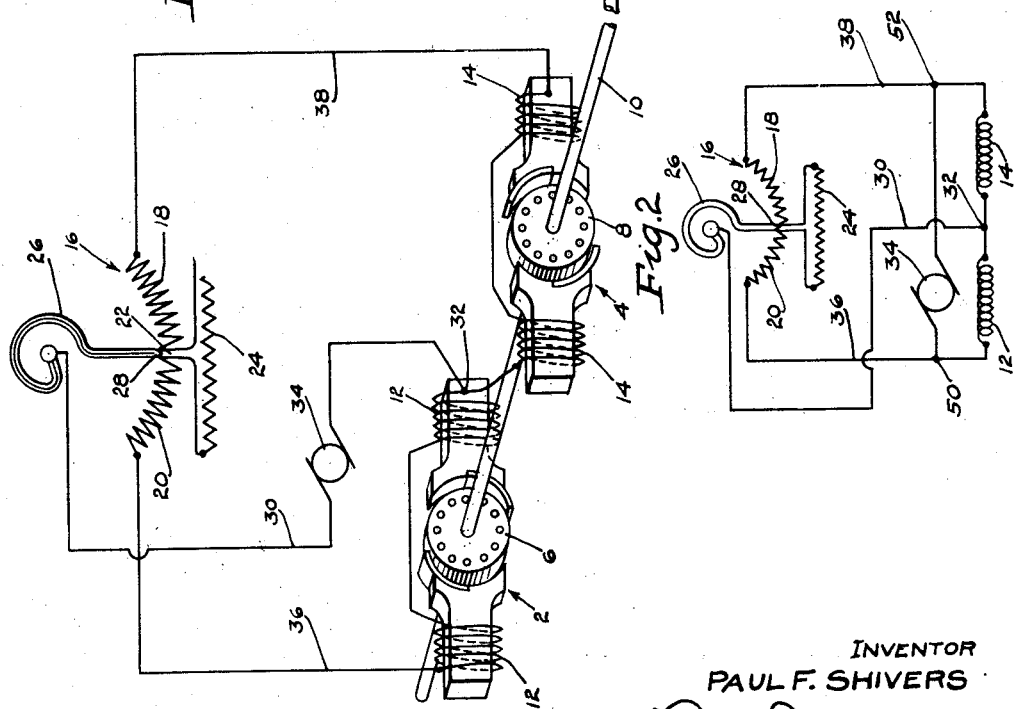
INVENTOR
PAUL F. SHIVERS
By Paul, Paul Moore
ATTORNEYS Patented Sept. 13, 1932

1,877,605

UNITED STATES PATENT OFFICE

PAUL F. SHIVERS, OF WABASH, INDIANA, ASSIGNOR TO MINNEAPOLIS-HONEYWELL REGULATOR COMPANY, OF MINNEAPOLIS, MINNESOTA, A CORPORATION OF DELAWARE

OPPOSED MOTOR CONTROL SYSTEM

Application filed May 16, 1931. Serial No. 537,884.

The present invention relates to remote control systems and more particularly to such systems in which the control is effected by means of a pair of opposed motors so connected that the rotor of the one having the greater torque will rotate the rotor of the other against the influence of its own field. A general object of the invention is the provision of a system providing for positive actuation of a controlled object responsive to a control member.

According to the present invention, in one of its simple forms, a pair of electric motors, preferably induction motors, having their rotors mounted on a common shaft, are connected in series in the loop of a Wheatstone bridge circuit so that their fields form a pair of resistances therein. The other resistances of the circuit are positioned at the control end and are variable in nature so that the relative amounts of current flowing through the two motors may be varied at the control end. Upon a change in the relative amounts of current flowing through the two opposed motors, there will be a variation in torque and the rotor of greater torque will rotate that of lesser torque against the influence of its own field. By connecting the element to be controlled to the rotor of one of the motors it is therefore possible to control movement of such element from the controlled end of the circuit. The nature of the controlled element is immaterial insofar as this invention is concerned. It may consist of a valve damper, or an electrical switch, for instance. Any desired control member may be used.

The invention finds particularly useful application in remote control systems wherein the controlling element is a temperature responsive device. Thus a bi-metallic strip may be arranged to actuate the variable resistance of the Wheatstone bridge circuit to vary the current flowing through the opposed motors and thus effect the desired control in accordance with temperature changes in the medium surrounding the bi-metallic strip.

It is a further object of the invention to provide means in a control system embodying a Wheatstone bridge circuit for increasing the sensitivity of the system in response to relatively slight changes in the movement of the controlling element.

Again, it is an object of the invention to provide an arrangement wherein the movable contact actuated by the controlling element does not carry current when the system is in balance.

The various objects and novel features of the invention will become more readily apparent upon a detailed study of the drawing together with the specification and accompanying claims.

In the drawing, Fig. 1 represents a diagrammatic showing of one form of the invention wherein a valve is controlled by means of a thermally responsive device.

Fig. 2 is a diagrammatic showing of a modification of the circuit shown in Fig. 1.

Referring to Fig. 1, the two motors 2 and 4 which are shown as induction motors having their fields shaded for opposed rotation, have their rotors 6 and 8 fixed upon a common shaft 10. The fields 12 and 14 of the motors 2 and 4 respectively, are electrically connected in a loop together with the composite variable resistance generally designated at 16. This composite resistance comprises a pair of resistances 18 and 20 separated by a very slight gap 22 which is bridged by the resistance 24 connected in series with the resistances 18 and 20. A control member comprising any thermally responsive device 26, which may be a bi-metallic strip whose end is adapted to describe an arc with variations in temperature, carries a contact 28 at its tip which is adapted to engage the exposed windings of the resistances 18 and 20 in the course of its travel under temperature fluctuation. The loop connecting the composite variable resistance 16 and the fields 12 and 14 in series, is bridged by a line which connects the contact 28 with the loop at point 32 lying between the field windings 12 and 14. The wire 30 of the bridge line communicates with a source of electrical energy 34.

It will readily be observed that the resulting arrangement comprises a Wheatstone bridge circuit in which one of the branches of the loop includes that side of the composite variable resistance 16 to the left of the contact 28 together with the field 12 of the motor 2, whereas the other branch includes the right side of the composite variable resistance and the field 14 of motor 4. Assuming, for example, that contact 28 is in the middle of resistance 20, the left branch of the loop is as follows: contact 28, left half of resistance 20, wire 36, field 12 to point 32. Under the same assumption the right branch will be: contact 28, right half of resistance 20, resistance 24, resistance 18, wire 38, field 14, to point 32. The bridge line comprises wire 30, bi-metallic strip 26 and contact 28. The fields of the motors 2 and 4 each form separate resistances in the loop.

Assuming resistance 20 to equal resistance 18, and further assuming fields 12 and 14 to offer equal resistances, the bridge will be balanced when the control is in the position shown in Fig. 1. When the bridge is balanced, the current flowing from the source of electricity will be divided evenly between the fields 12 and 14 so that the rotors 6 and 8 will exert equal and opposite torques to hold the common shaft 10 stationary. Upon movement of the bi-metallic element 26 and its contact 28 from the position shown in Fig. 1 however, the balance will be disturbed and unequal currents will flow through the fields 12 and 14 so that the torques of the rotors 6 and 8 will be unequal and the shaft 10 will rotate in the direction for which the field of the rotor of greater torque is shaded, the rotor of lesser torque acting as a brake.

The element to be controlled is connected to the common shaft 10. In the example illustrated in Fig. 1, the valve stem 40 of the valve 42 is provided with rack teeth 44 communicating with a pinion 46 which in turn is connected to the shaft 10 through the reduction gear train generally designated at 48.

As an example of the operation of the device let it is assumed that the bi-metallic element 26 assumes a position such that the contact 28 is placed intermediate of the resistances 18 and 20 within the gap 22 as shown in Fig. 1 when the temperature desired to be maintained exists. Assuming that the valve 42 is a fuel valve or a valve controlling the passage of heating medium to a radiator or the like, it may be conveniently arranged to be approximately one-half open when such temperature prevails. As previously explained, equal amounts of currents will be flowing through the motors 2 and 4 so that the shaft 10 will remain stationary. If a drop in temperature be now assumed, the bi-metallic strip 26 will move towards the right putting more resistance in series with the field 12 and less in series with the field coil 14, and as a consequence the current flow through field coil 14 will be increased while that through 12 will suffer a corresponding decrease. The torque of the rotor 8 will therefore be greater than that of the rotor 6 and the shaft 10 will be rotated in counter-clockwise direction looking from the right, assuming that motor 4 is connected for such rotation or has its field shaded for such rotation whereas motor 2 has its field shaded for opposite rotation. The gear train is so arranged that rotation in counter-clockwise direction of the shaft 10 will cause the valve 42 to be opened an additional amount so as to provide for a larger flow through the conduit being controlled.

If it now be assumed that the temperature has risen so that the bi-metallic strip will move the contact 28 to the left, the bridge will again be in balance and the shaft 10 held stationary when the contact 28 reaches the gap 22 between resistances 18 and 20. Should the temperature then rise to a higher degree so as to move contact 28 to the left of gap 22 over resistance 20, there will be a corresponding decrease in the resistance of the left branch of the circuit with the result that more current will flow through motor 2 than through motor 4. Shaft 10 will then rotate in clockwise direction looking from the right and this rotation of the shaft will be communicated to the valve stem 40 through gearing 48 and pinion 46 to correspondingly close the valve.

Where using the control circuit for thermally controlling a valve in a heating system as shown in Fig. 1, it has been found advantageous to so proportion the reduction gearing 48 with respect to the time lag between the control of the heating system and the corresponding temperature change produced thereby, that under ordinary conditions of operation the temperature of the medium surrounding the bi-metallic strip 26 will be raised or lowered as the case may be before the valve reaches the end of its travel.

It is possible to make the size of the gap 22 so small that the contact 28 will engage both of the resistances 18 and 20 even when in central position as shown in Fig. 1. In this case, current will flow through the contact 28 when the bridge is in balance. If desired, however, the gap 22 can be made slightly wider than the contact 28 so that connection between the loop and the source of power 34 will be broken when the contact 28 is in central position, i. e. when the temperature desired to be maintained exists. In the latter case, current will only flow through the contact 28 when a temperature which is to be corrected exists, i. e. a temperature which would cause the bi-metallic element to move to the left or to the right of gap 22, for upon the existence of desired temperature, no power whatsoever will be consumed in the control circuit. It must be borne in mind, however, that the gap 22 cannot be appreciably wider than the contact 28 without adversely affecting the sensitivity of the control to slight temperature variations on either side of the temperature being maintained. It will be readily apparent that in practice the gap need be no wider than the spaces provided between the windings of the individual resistance coils 18 and 20 for insulation purposes. It is only necessary that resistances 18 and 20 be separated sufficiently to prevent a short circuit cutting out resistance 24 when the contact 28 is removed from the gap.

The composite variable resistance 16 is made of the resistances 18 and 20 bridged by the resistance 24 in order to provide for sensitivity in the system. Due to starting inertia and friction there must be an appreciable difference in torque between the rotors 6 and 8 before the shaft 10 will actually begin to rotate and in order to provide for this necessary difference it is necessary to have a correspondingly appreciable difference between the currents flowing through the field windings of the respective motors. Due to the arrangement of the slight gap 22 bridged by the resistance 24, a very appreciable change of resistance will take place between the branches of the loop upon only a slight deviation of the contact 28 from one side to the other of its position at desired temperature. Assuming the contact to be in central position within the gap, a minute movement of the contact to the left will add the resistance 24 to the right branch of the circuit with the result that there will be a sufficient difference in the currents flowing to the motors to overcome the inertia and friction. Under this arrangement, it will be seen that the control will be placed in operation even upon only very slight movements of the controlling element to either side of neutral or balanced position. If the composite resistance 16 were wound in one continuous coil, it will be apparent that an appreciable movement from neutral position would be required on the part of contact 28 before a sufficiently great difference in torque would be set up between the rotors 6 and 8 to move the shaft 10.

Fig. 2, wherein the elements similar to those in Fig. 1 have been given like reference numerals, discloses a slightly modified form of circuit wherein no current flows through the contact 28 and thermally responsive device 26 when the bridge is in balance. In this form, the source of power is connected across the loop at points in the loop between that part occupied by the field coils 12 and 14 and that part occupied by the composite variable resistance 16 as shown at 50 and 52. The current flowing through field coils 12 and 14 will be varied upon movement of bi-metallic element 26 and its contact 28. It will further be apparent that the contact 28 and thermally responsive device 26 only carry the unbalanced part of the current when it deviates from the central position at the gap. This modified circuit has the advantage over the circuit shown in Fig. 1 that the contact carries less current.

It will be understood that in either modification, the control member may be automatically responsive to any desired condition such as temperature, pressure, or humidity for instance, or may be manually operated if desired.

Reference in the claims to a pair of electric motors or electrically operated actuating devices will be understood to include a motor having a single armature and opposed fields.

I claim as my invention:

1. In an electrical remote control system, a variable resistance comprising a pair of resistances separated by a slight gap bridged by a third resistance and having a movable contact adapted to contact with said pair of resistances, a pair of electric motors, a closed loop connecting the variable resistance and the fields of the motors in series, a bridge line across the loop connecting the movable contact of the variable resistance therewith at a point between the fields of said motors, and mechanical means connecting the rotors of motors for causing the rotative force of one under the influence of its field to oppose that of the other, and a source of electrical energy connected to said loop.

2. In an electrical remote control system, a variable resistance comprising a pair of resistances separated by a slight gap bridged by a third resistance and having a movable contact adapted to contact with said pair of resistances, a pair of electric motors, a closed loop connecting the variable resistance and the fields of the motors in series, a bridge line across the loop connecting the movable contact of the variable resistance therewith at a point between the fields of said motors, a source of electrical power connected to said loop, and mechanical means controlling the relative rotation of the rotors of the motors.

3. In an electrical remote control system, a composite variable resistance comprising a pair of resistances separated by a slight gap bridged by a third resistance and having a movable contact adapted to co-operate with said pair of resistances, a pair of electric motors having their rotors connected to a common shaft, a closed loop connecting the variable resistance and the fields of the motors in series, a source of electrical energy connected to said loop, and a bridge line across the loop connecting the movable contact of the variable resistance therewith at a point between the fields of said motors.

4. In an electrical remote control system, a composite variable resistance comprising a pair of resistances connected in series by a third resistance bridging a slight gap separating said pair, a movable contact co-operating with said pair of resistances, a pair of electric motors having their rotors fixed on a common shaft, a closed loop connecting the variable resistance and the fields of the motors in series, said motors being connected for opposed rotation of their rotors, a source of electrical energy connected to said loop, and a bridge line across the loop connecting the movable contact of the variable resistance therewith at a point in the loop between the fields of said motors.

5. In an electrical remote control system, a composite variable resistance comprising a pair of resistances connected in series through a third resistance bridging a slight gap separating said pair of resistances, said composite variable resistance having a movable contact co-operating with said pair of resistances, a pair of electric motors, a closed loop connecting the variable resistance and the fields of the motors in series, a bridge line across the loop connecting the movable contact of the variable resistance therewith at a point between the fields of said motors, and a source of energy connected across said loop and making connections therewith at points in the loop between that part of the loop containing the fields of the two motors and that part of the loop containing the variable resistance.

6. In an electrical remote control system, a composite variable resistance comprising a pair of resistances connected in series through a third resistance bridging a slight gap separating said pair, said composite variable resistance having a movable contact engaging exposed surfaces of said pair of resistances, a thermally responsive element actuating said movable contact, a pair of electric motors having their fields connected in series with said composite variable resistance thereby forming a closed loop, a source of electrical energy connected to said loop, mechanical means connecting the rotors of the motors for causing the rotative force of one under the influence of its field to oppose that of the other, and a bridge line connecting the movable contact of the variable resistance with the loop at a point between the fields of said motors.

7. In an electrical control system having a Wheatstone bridge circuit, a pair of electrically actuated devices connected in said circuit to form resistances therein, and a power source connected to said circuit, a composite resistance comprising a pair of resistances separated by a slight gap and having exposed contact surfaces, a third resistance connecting said pair of resistances in series across said gap, and a movable contact adapted to engage the exposed contact surfaces of said pair of resistances, said composite resistance being in the loop of the bridge circuit and its movable contact being connected to an end of the bridge line across the loop.

8. In an electrical remote control system, a composite variable resistance comprising a pair of resistances connected in series by a third resistance bridging a slight gap separating said pair, a movable contact co-operating with said pair of resistances, a pair of opposed electrically operated actuating devices, a closed loop connecting the composite variable resistance and said electrically operated actuating means in series, a source of electrical energy connected to said loop, and a bridge line across the loop connecting the movable contact of the composite variable resistance with the loop at a point therein between said electrically operated actuating devices.

In witness whereof, I have hereunto set my hand this 6th day of May 1931.

PAUL F. SHIVERS.